June 15, 1954
F. T. ROLLER
2,681,118
FLEXIBLE SUSPENSION OF GEAR CASES AND
WHEEL DRIVE AXLES EXTENDING THEREFROM
Filed Sept. 1, 1949
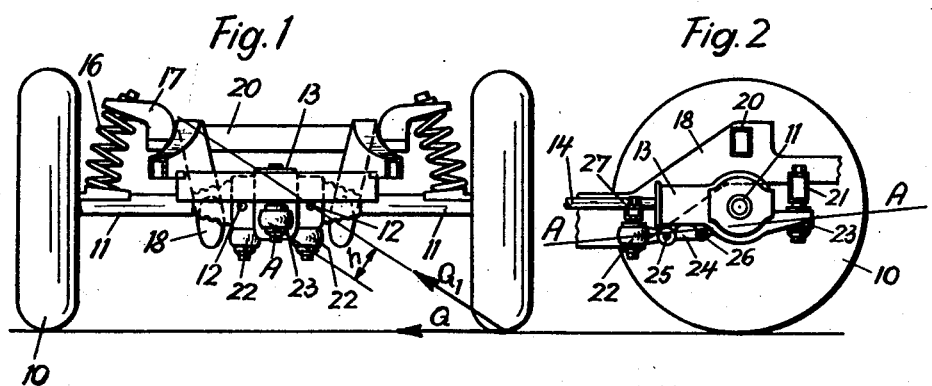
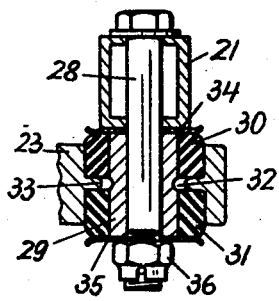
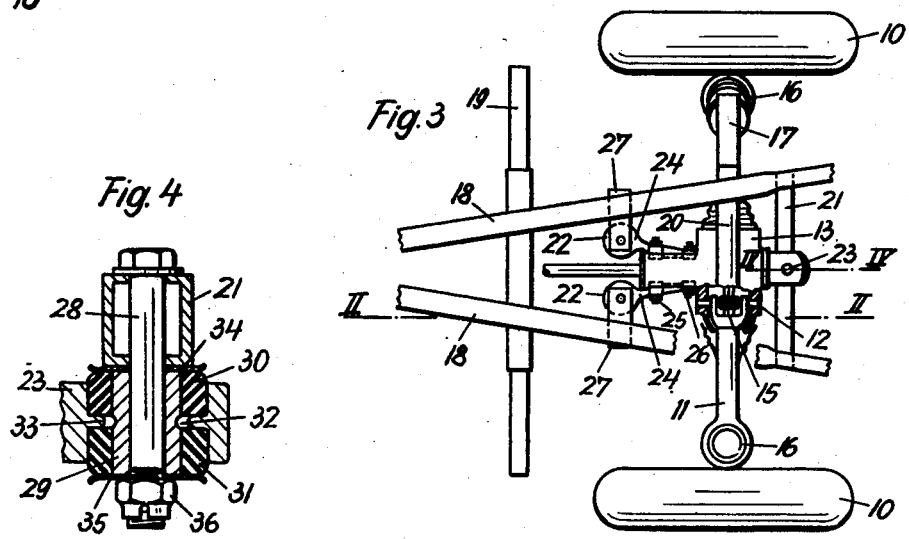
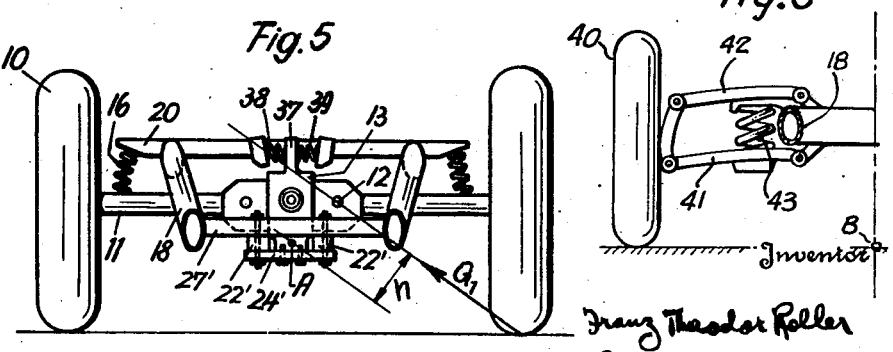
Inventor
Franz Theodor Roller
By Licke and Padlon
Attorneys Patented June 15, 1954

2,681,118

UNITED STATES PATENT OFFICE 2,681,118

FLEXIBLE SUSPENSION OF GEAR CASES AND WHEEL DRIVE AXLES EXTENDING THEREFROM

Franz Theodor Roller, Stuttgart, Germany, assignor to Daimler-Benz Aktiengesellschaft, Stuttgart-Unterturkheim, Germany Application September 1, 1949, Serial No. 113,511

Claims priority, application Germany October 1, 1948

12 Claims. (Cl. 180—73)

In the well-known axle bearers which are flexibly suspended on the superstructure of the vehicle, e. g. rear axle gears to which the oscillating half-axles are linked on laterally, the flexible suspension members are substantially located in the plane of the joints of the oscillating axles, i. e. so that transverse shocks coming from the road, which are transferred from the wheels through the half-axles to the rear axle casing, that acts as an axle bearer, are substantially and immediately balanced as transverse shocks by the elastic supports or suspension members. These supports, which, as a rule, consist of rubber cushions are, however, restricted in size with regard to both reliable seating and economy of material.

In comparison with the foregoing, the present invention substantially is characterized in that the axle bearer is flexibly suspended outside the direction of force which is transferred to it by transverse shocks through the wheels, i. e. below or above that direction of force in such a manner that under the effect of these shocks it is allowed to freely swing round a longitudinal axis of the vehicle. This means that the axle carrier is suspended at a height outside of the plane through the axes of the joints of the oscillating axles. The maximum distance of this plane from the plane through the mentioned joint axes is determined by the necessary ground clearance and in the other direction (upwardly) preferably does not exceed this distance. The invention is of importance in particular for oscillating half-axles and similar track-changing swinging axles but may be also applied to wheels guided parallel or substantially parallel. The invention is of particular importance for motor vehicles. In the conventional oscillating half-axles, the direction of force of the transverse shocks transferred from the road to the axle bearer is determined by a straight line which goes through the contact points of the wheels with the road on the one hand and through the articulation of the half-axles at the axle bearer on the other hand. The suspension is conveniently made in cases of laterally linked-on oscillating half-axles below the direction of forces and below the axle centers or driving shafts for the wheels as well as below the driving shaft for the rear axle gear, since in that case a particularly long effective lever arm for balancing the transverse shocks will be attained.

The suspension is conveniently made in three points by means of rubber cushions, or buffers, for example annular ones, inserted between the axle bearer and the superstructure or frame, of which two each are arranged, e. g. preferably by superposition, in order to balance the forces occurring in the seating in a particularly advantageous manner. But also four-point suspension may be provided. The rubber-buffers preferably are under pre-tension. Instead of rubber also other suitable resilient and resistant materials may be used, e. g. certain artificial resins as obtained by polymerisation, e. g. vinyl polymerisates. Generally speaking instead of rubber buffers other buffers may be provided which allow limited movements about a longitudinal axis and preferably in all directions but especially such that it is allowed to swing mainly or efficiently around a longitudinal axis of the vehicle determined by the resilient suspension. Preferably the construction is such that the flexibility in the perpendicular direction is the greatest one in the case of suspension members arranged laterally to the center longitudinal plane. In the case of suspension members arranged in the center longitudinal plane the construction preferably is such that a flexibility around a longitudinal axis of the vehicle through the suspension members is especially great.

The present invention permits to attain a smoother and more efficient balancing of the transversely directed shocks coming from the road as compared to the conventional arrangement with equal dimensions of the rubber cushions and without addition of further constructional elements only by the lowering or raising respectively of the flexible seating, in that the shocks which are transferred through the axle joints to the axle bearer will substantially cause, due to the rather long lever arm with reference to the fulcrum, which is situated in the plane of the flexible seating, substantially only an oscillating movement of the axle bearer around the low- or high-positioned axis of oscillation, the position of which is determined by the flexible suspension.

It is, however, also possible—in particular with increased flexibility of the axle bearer around its longitudinal axis of oscillation—to provide additional springy elements, the effect of which is opposed to that of the flexibility, e. g. springs or rubber cushions horizontally located, e. g. above the axis of oscillation between the axle bearer and the superstructure. Such an arrangement possesses the advantage that the effective lever arm for the transverse shocks might be made particularly long or the flexibility of the suspension particularly large without however impairing the safe working of the suspension. Even heavy shocks may be, thus, most efficiently balanced and the kinematics of the oscillating movement of the axle drive are safety governed whilst the danger of overstressing the rubber cushions or other suspension elements by possibly heavier shocks is completely avoided. The additional springy elements may in this case also show a progressive spring characteristic and e. g. simultaneously determine the terminal positions for the deflections of oscillation.

It may be, furthermore, particularly advantageous to impart to the natural axis of oscillation of the axle bearer, which is determined by the flexible seating, an inclined position with respect to the horizontal of the superstructure or frame, e. g. slightly rising from front to back, particularly in the event that the axle bearer carries the oscillating half-axles for the rear wheels and that the front wheels of the vehicle are guided substantially in parallel. It is a well-known fact that in such a case the longitudinal axis for the transverse oscillations of the total superstructure of the vehicle will have an upgradient from front to back. If now the axis of oscillation of the axle bearer, as it is determined by the flexible suspension, has substantially the same direction as the aforementioned axis of oscillation of the superstructure of the vehicle, any additional relative movements between the axle bearer or the wheels and the road, as they might be provoked by the simultaneous transverse oscillations of the superstructure of the vehicle with reference to the road on the one hand and those of the axle bearer with reference to the superstructure on the other hand will be excluded. Such an inclined axis of oscillation of the axle bearer is, for the rest, also then advantageous, if it is e. g. at the level of the axle joints as well as where due to the corresponding guidance of the wheels a correspondingly inclined axis for the transverse oscillations of the superstructure of the vehicle will be obtained. The invention is, furthermore, of special importance e. g. for such axle suspensions where the half-axles are hinged at the axle bearer, in particular at the rear axle drive casing by means of trunnion-like joints and the half-axles are cushioned by laterally yielding springs, e. g. unguided coil springs, since in such a case all horizontally directed shocks from the road are positively transferred to the axle bearer, which is exposed to very heavy stresses. The supporting points of the axle bearer, seen in the longitudinal direction of the vehicle, shall conveniently have a distance from each other as large as ever possible; this makes for a stable seating round the longitudinal axis of oscillation of the axle bearer with a particularly advantageous utilization of the transverse flexibility. To this end the rear axle drive casing might be provided with brackets which project lengthwise over the casing.

The accompanying drawing shows preferred embodiments of the invention, viz.,

Fig. 1 is a rear view of the rear axle unit of a motor vehicle,

Fig. 2 is a side view of the same unit in a section along the line II—II of the Fig. 3, Fig. 3 is a top view of the unit, Fig. 4 is a section through the rear flexible seating of the axle gear along the line IV—IV of the Fig. 3, on a larger scale, Fig. 5 is a further exemplified embodiment of the invention according to Fig. 1, but this time a front view, and Figure 6 shows a front view of the front wheel suspension of a motor vehicle.

The rear wheels 10 are flexibly seated in a transverse plane of the vehicle on so-called oscillating half-axles 11, which by means of lateral knuckle joints 12 are linked on the axle drive casing 13 which serves as the axle bearer. The wheels are propelled by means of a shaft 14 driven by the engine, the former in its turn driving by means of the differential gear which is located within the axle gear casing, and through the universal joints 15, located between the forked ends (pivoted joints) of the half-axles, the wheel shafts, which are mounted in the half-axles. The wheels are each cushioned as is shown by the example according to Figures 1 and 3 by an unguided coil spring 16, which leans with its lower end to the associated oscillating half-axle and with its upper end to a bracket 17 in the frame. The springs are connected to the half-axle and to the bracket 17 respectively, for example, in the well-known manner, namely, by clamping elements. The frame consists substantially of longitudinal rails 18 arranged in the form of an X, being connected with each other by means of cross-members, e. g. 19, 20 and 21. The latter have a round or a box-shaped section. Welded to the cross-member 20 are the spring brackets 17. The body of the vehicle may be set upon the frame or connected therewith at will. A self-supporting body or the like might be employed instead of a superstructure formed by the frame and the body.

The rear axle drive casing 13 is flexibly supported on the frame at three points, viz. by means of two front bearing eyelets 22 and a rear eyelet 23. In this case the bearing eyelets 22 are formed by arms 24, which are screwed to both sides of the casing by means of the screws 25 and 26 and project over the casing forward so as to form a large distance between the front bearing eyelets 22 on the one hand and the rear eyelet 23 on the other hand. The rear axle drive is suspended by means of the aforementioned brackets to the girder-shaped trusses 27, which have been welded to the longitudinal rail 18 and are projecting inwards, whilst the rear suspension is effected by means of the eyelet 23 on the cross-member 21.

The rear axle drive casing is flexibly seated on the frame in every direction by the intercalation of rubber cushions which have been located in the bearing eyelets. The details of such a seating are shown by way of example by the Fig. 4, which shows the rear suspension. The fastening to the cross-member 21 is made in this case by means of a vertical bolt 28, which traverses both the cross-member 21 and the eyelet 23. Said bolt 28 is surrounded within the eyelet by a sleeve or case 29. Between the outer face of this sleeve and the inner face of the eyelet there have been inserted two rubber rings 30 and 31, e. g. with a radial initial tension, so that they bear axially and in opposite directions against a middle collar 33 of the eyelet, the collar projecting towards the sleeve 29, leaving, however, a clearance between the sleeve and the collar. On both sides of the rubber rings 30 and 31 are, furthermore, the pressure plates 34 and 35, located on the bolt 28 in such a manner that upon screwing on the nut 36 they will bear in an axial direction against the rubber rings from both sides, thus imparting to them an initial tension against the collar 33 of the eyelet. The initial tension to be attained by the rubber rings is limited by the sleeve 29, which in this connection acts as a spacer. By means of this arrangement all forces acting in the suspension can be balanced without objection. This embodiment allows in particular a sufficient flexibility in vertical direction as well as in the direction of rotation round a horizontal axis, substantially running through the eyelet. The front suspension at 22 is substantially similar as applied to corresponding parts. Generally speaking the rubber rings each with a substantially vertical axis bear radially inwards against one part of the vehicle superstructure (i. e. frame or body) and radially outwards against the other part of the vehicle (axle bearer), whilst they abut in their axial direction against these two vehicle parts from different sides each.

The eyelets containing the elastic members are located, as is shown particularly by the Fig. 2, in a plane with the section straight line A—A, which is positioned below the plane passing through the axle centers (joints 12) viz. through the driving shaft 14. The plane or straight line respectively has in this case a slight up-gradient from front to rear, which is of advantage preferably with vehicles the front wheels of which are guided in parallel as shown in Figure 6; this implies apart from a most advantageous special arrangement of the seating the other advantages, which have been set forth above.

Forces or shocks upon either wheel 10 when travelling over a road surface are transmitted to the axle gear housing through the joints 12, as shown by the vector $Q_1$ in Figure 1. The force $Q_1$ passes through the right joint 12 as viewed in Figure 1, which belongs to the wheel 10 not shown in Figure 2, and continues above the left joint 12 which belongs to the wheel 10 visible in Figure 2. In case of swinging motions which the transmission carries out as its own swinging motions, for example, caused by the effect of forces resulting from momentum or inertia, a swinging axis is created corresponding to line A—A as shown in Figure 2, provided however that the rubber bumpers are formed symmetrically and are uniformly pre-stressed. In its capacity of natural swinging axis, this line A—A may also be regarded as the reference line for the turning moments resulting from the forces $Q_1$. These turning moments will be the greater the lower this axis A—A is located, and they will become the smaller the nearer this axis A—A approaches the intersection of the vectors $Q_1$ with the central longitudinal plane of the vehicle. In other words, the turning axis around which the vehicle superstructure will turn under centrifugal forces is determined by the intersection of the vectors $Q_1$ with the vertical central longitudinal plane of the vehicle. Owing to the all-round flexible seating of the casing in the eyelets 22 and 23, the natural axis of rotation for the axle drive casing with reference to the frame is formed by the line A—A in the plane of these eyelets. The force $Q_1$ is allowed therefore to attack at the joint 12 with a large lever arm $h$ and this involves enlarged flexibility of the axle drive casing with respect to these forces and thus a very smooth suspension of the same.

The embodiment according to Fig. 5 is distinguished from the above described one substantially in that the axle drive casing abuts by means of a supplementary arm 37 directed towards and above the buffer springs 38 and 39 and therefore in as large a distance as possible from the axis of oscillation A in the direction of rotation, these buffer springs in their turn bearing against the cross-member 20 of the frame. They are at the same time enabled to limit the deflections of oscillation of the axle drive casing round the axis A—A (designated A in Figure 5) and may possess a progressive springing characteristic, e. g. with progressively increasing resistance producing a damping effect. Generally speaking suitable stops may be provided to limit the deflections of the oscillation of the axle bearer round the axis of oscillation which is determined by the flexible suspension. Instead of the springs 38 and 39, e. g. also rubber cushions or similar elements may be provided.

It is to be noted, furthermore, that the suspension in the embodiment of the invention according to the Fig. 5 is performed by rubber cushions 22' (shown in the drawings only diagrammatically) located between a cross-member 24' of the axle drive casing and a cross-member 27' of the frame.

In Figure 6 is shown a conventional suspension of a front wheel 40. Wheel 40 is guided in parallel by two guiding rods 41 and 42, which are arranged one above the other and fastened to the frame, and which, for example, may be springily supported against the frame by means of a helical spring 43. The turning axis of the frame or the superstructure, i. e., the point around which the frame or superstructure will turn under centrifugal forces, lies with such wheel suspensions, as is well-known, in a point B in the height of the road and in the vertical central longitudinal plane of the vehicle between the two front wheels 40. Thus, as a result of the inclination of the plane A—A, a condition may be achieved whereby the swinging axis of the elastic suspension of the rear axle arrangement passes approximately through the point B between the front wheels.

While the term superstructure is used herein in connection with the invention, it will be noted that this term includes vehicles with frames as well as self supporting vehicle bodies or with combined body structure.

I claim:

1. In a power vehicle, a frame, an axle gear housing, swinging half-axles each with a vehicle wheel, joints whose joint axes extend in the direction of drive, for connection of the swinging half-axles with the axle gear housing, elastic buffers for elastically and jointlessly mounting of the axle gear housing in the frame, whereby these buffers are located outside that plane which extends through the contact points of each wheel on the one hand and the joint axis through which passes the wheel carrying swinging half-axles, and abutments spaced at the greatest possible distance from the plane determined by the elastic buffers between the axle bearing housing and the frame, by means of which the swinging movement of the housing in the elastic buffers is limited with respect to the frame.

2. A power vehicle, in combination with claim 1, in which the elastic buffers are arranged below and the abutments above the joints.

3. A power vehicle, in combination with claim 1, further including springing means between the abutments against whose springing effect the housing moves before the abutments come into contact.

4. In a power vehicle, a frame, an axle gear housing including an axle gear, a driving shaft for driving said axle gear and extending from one end of said axle gear housing in the longitudinal vertical central plane of the vehicle, swinging half axles, means for pivotally connecting said half axles to said gear housing, a bearing eyelet mounted on said housing in the center longitudinal plane of the vehicle and projecting from the other end of said axle gear housing opposite said driving shaft, two bearing arms connected to said gear housing and extending in a longitudinal direction beyond said first-mentioned end of said gear housing closely adjacent on both sides of said driving shaft, and elastic means for elastically attaching said axle gear housing to said frame by means of said bearing arms and said bearing eyelet, said elastic means being located below said pivot means.

5. A power vehicle according to claim 4, in which said frame comprises longitudinal and transverse bearing members including bearing brackets extending inwardly from said longitudinal bearing members and wherein said axle gear housing is mounted on said transverse bearing member by said bearing eyelet and on said bearing brackets by said bearing arms.

6. In a motor vehicle, an axle gear case, a pair of swinging half axles, each axle having a wheel supported thereon, each axle having a joint connecting the axle with said axle gear case, a vehicle frame comprising longitudinal side bearers crossing said half axles and transverse members in front and behind said axle gear case, a bearing support projecting from one end of said axle gear case, means for flexibly fastening said bearing support on one of said transverse members, a pair of lateral bearing arms projecting from the other end of said axle gear case in a longitudinal direction beyond said axle gear case a relatively small distance apart with respect to the entire bearing length of said axle gear case and below said axle gear case, and means for flexibly fastening said bearing arms on the other of said transverse members corresponding to that end of said axle gear case, said front and rear flexible means being arranged in a plane lower than said joints, said longitudinal bearers crossing said half axles thereabove, and said transverse members lying approximately at the height of said joint, said bearing supports and said bearing arms extending toward said transverse members from below thereof.

7. In a motor vehicle, an axle gear case, a drive shaft driving the axle gear and extending in the longitudinal direction of the vehicle, a pair of swinging half axles, each having a wheel supported thereon and each having a joint connecting the axle with said axle gear case, a vehicle frame comprising laterally disposed longitudinal bearers bent at an angle above said swinging half axles, a transverse bearer crossing said axle gear case at the end opposite said drive shaft and transverse members projecting from said longitudinal bearers toward said drive shaft at the other end of said axle gear case, a bearing support projecting from said axle gear case toward said transverse bearer, means for flexibly fastening said bearing support to said transverse bearer, bearing arms on both sides of said drive shaft extending from said axle gear case in a longitudinal direction beyond said axle gear case and toward said transverse members, and means for flexibly fastening said bearing arms to said transverse members, said first-mentioned and said last-mentioned flexible fastening means being arranged in a plane below said joints.

8. In a motor vehicle, an axle gear case, a pair of swinging half axles, each axle having a wheel supported thereon, each axle having a joint connecting the axle with said axle gear case, a vehicle frame comprising longitudinal side bearers crossing said half axles and transverse members in front of and behind said axle gear case, a bearing support projecting from one end of said axle gear case, means for flexibly fastening said bearing support on one of said transverse members, a pair of lateral bearing arms projecting from the other end of said axle gear case in a longitudinal direction beyond said case a relatively small distance apart with respect to the entire bearing length of said axle gear case and below said axle gear case, and means for flexibly fastening said bearing arms on the other of said transverse members corresponding to that end of said axle gear case, said flexible fastening means lying in a plane below said joints and extending substantially through the lower wall of said axle gear case to enable said axle gear case to swing around a longitudinal axis substantially lying in said plane.

9. In a power vehicle frame for automotive vehicles, an axle gear case, a plurality of swinging half axles, each axle having a wheel supported thereon, a joint for connecting each of said swinging half axles to said axle gear case, jointless suspension means including elastic buffer means for suspending said axle gear case on said frame, said suspension means being positioned substantially lower than said connecting joints in a plane substantially extending through the lower wall of said axle gear case to enable said axle gear case to swing around an axis substantially lying in said plane, longitudinal side and transverse members, said elastic buffer means supporting said axle gear case on said transverse members, an additional transverse member extending beyond said longitudinal members, and spiral springs with the lower ends thereof resting against said half axles and the upper ends thereof resting against said additional transverse member.

10. In a power vehicle frame for automotive vehicles, an axle gear case, a plurality of swinging half axles, each axle having a wheel supported thereon, a joint for connecting each of said swinging half axles to said axle gear case, jointless suspension means including front and rear elastic buffers means for suspending said axle gear case on said frame, said suspension means being positioned substantially lower than said connecting joints in a plane substantially extending through the lower wall of said axle gear case to enable said axle gear case to swing around an axis substantially lying in said plane, longitudinal side and transverse members, said elastic buffer means supporting said axle gear case on said transverse members, an additional transverse member extending laterally beyond said longitudinal members, spiral springs with the lower ends thereof resting against said half axles and the upper ends thereof resting against said additional transverse member, said axle gear being located in the rear part of the vehicle and the wheels supported by said swinging half axles being the rear wheels of said vehicle, a pair of front wheels, and means for suspending said front wheels on the frame to guide said front wheels substantially in parallel, the front elastic buffer means of said suspension means being lower than the rear buffer means so that a plane extending through said elastic buffer means slopes forwardly and intersects the road in the vicinity of said front wheels.

11. In a motor vehicle, the combination according to claim 7, comprising another transverse bearer crossing said axle gear case thereabove, said another transverse bearer extending laterally beyond said longitudinal bearers, and coil springs with the lower ends thereof resting against said swinging half axles and the upper ends thereof resting against said another transverse bearer.

12. In a motor vehicle, the combination according to claim 11, wherein said bearing arms are separable from said axle gear case, and means for removably fastening said bearing arms to said axle gear case.

References Cited in the file of this patent

UNITED STATES PATENTS

| Number | Name | Date |
|---|---|---|
| 2,010,415 | Roller | Aug. 6, 1935 |
| 2,256,069 | Wagner | Sept. 16, 1941 |
| 2,352,053 | Wilfert et al. | June 20, 1944 |
| 2,417,214 | Roos | Mar. 11, 1947 |
| 2,494,902 | Sanmori | Jan. 17, 1950 |

FOREIGN PATENTS

| Number | Country | Date |
|---|---|---|
| 430,977 | Great Britain | June 24, 1935 |
| 848,772 | France | Jan. 12, 1939 |